Oct. 6, 1942.    A. T. EMERY    2,297,753
VALVE SPRING ASSEMBLY
Filed Dec. 29, 1939    3 Sheets-Sheet 1
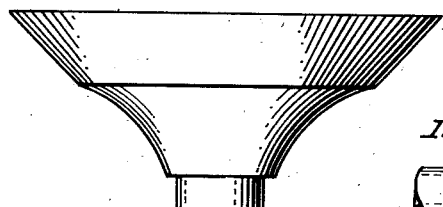
Fig.1
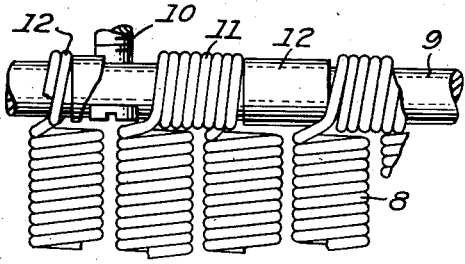
Fig.2
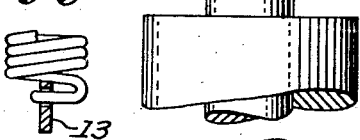
Fig.6
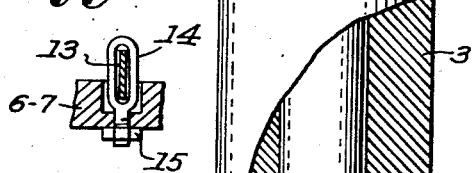
Fig.5
Fig.3
Fig.4
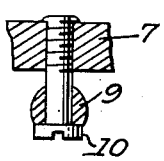
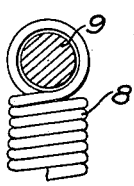
Fig.7
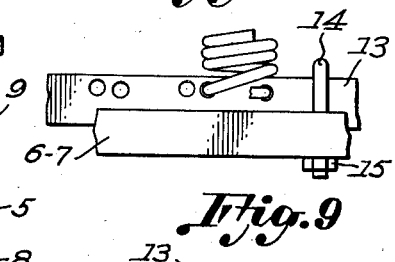
Fig.9
Fig.8
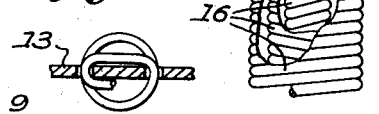
Inventor:
ARTHUR T. EMERY
By Barrett + Numan
Attorneys.

Oct. 6, 1942.   A. T. EMERY   2,297,753
VALVE SPRING ASSEMBLY
Filed Dec. 29, 1939   3 Sheets-Sheet 2

Inventor:
ARTHUR T. EMERY
By Barrett & Truman
Attorneys.

Oct. 6, 1942.                A. T. EMERY                2,297,753
                        VALVE SPRING ASSEMBLY
                        Filed Dec. 29, 1939            3 Sheets-Sheet 3
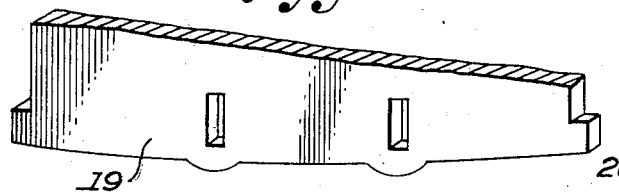
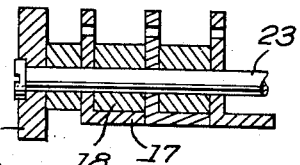
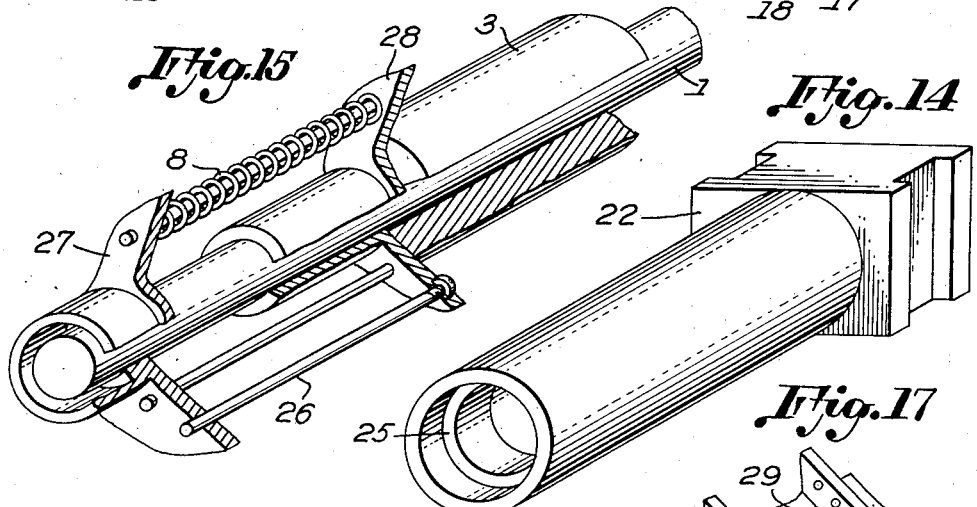
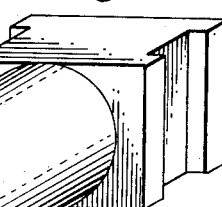
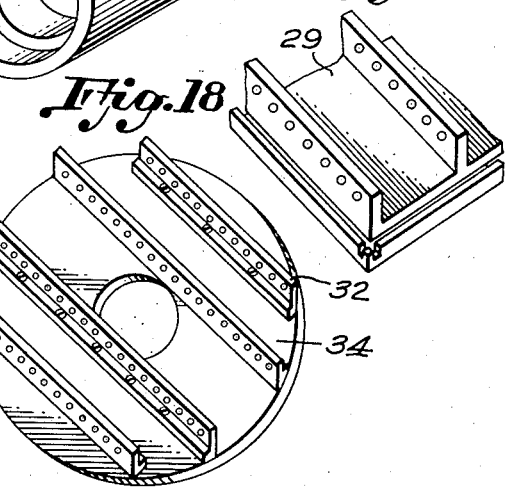
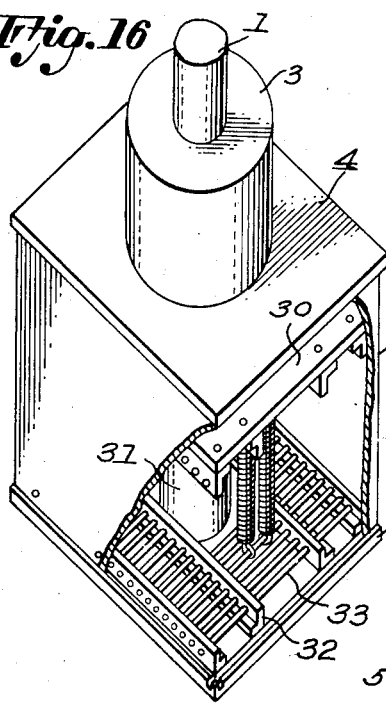
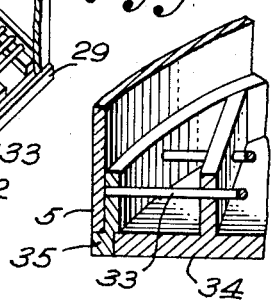
Inventor:
ARTHUR T. EMERY
By Barnett + Truman
Attorneys.

Patented Oct. 6, 1942

2,297,753

UNITED STATES PATENT OFFICE 2,297,753

VALVE SPRING ASSEMBLY

Arthur Thomas Emery, Corona, Calif.

Application December 29, 1939, Serial No. 311,549

7 Claims. (Cl. 123—188)

This invention is directed to new and useful improvements in valve spring assembly and is specifically directed to such an assembly adapted to function efficiently in connection with internal combustion motors at relatively high speeds.

Heretofore the efficiency of internal combustion motors has been definitely limited due to the inability of the spring mechanisms adapted to operate the valves to cause the tappets to follow the cams after a certain engine speed has been reached. This lag in operation of the valves necessarily impedes the efficient operation of the engine because with a valve partly open that should be closed on, for example, a compression stroke of the piston, fuel will be forced out through the partly open intake port and the compression will be lowered, while on the intake stroke the piston will draw into the cylinder products of the last explosion as well as new fuel.

The springs heretofore used fail for their lack of speed. To increase the speed, smaller springs must be used. As smaller springs are used their tension becomes insufficient to handle the load. To overcome this it is necessary to use a plurality or more properly a multiplicity of the smaller springs. These small springs will not support themselves so they cannot be used as compression springs for supplemental supporting means would cause friction.

The primary object of this invention is to provide a spring assembly utilizing many small, fast springs which will cause the valves to close properly at much higher speeds.

A further object of this invention is to produce a valve spring assembly of tension springs operable by the valve as compression springs.

Still another object of this invention is to provide a novel spring assembly whereby a plurality of relatively small springs are compactly arranged for operation.

Another object is to provide a novel method of determining the size and number of springs necessary for operating in combination to close valves at predetermined engine speeds under predetermined loads.

Other objects and advantages will become apparent from the following detailed description.

In the drawings:

Fig. 1 is a side elevation partly broken away and in section of a valve spring assembly embodying this invention.

Fig. 2 is an enlarged detail view of a portion of the assembly showing the spring spacing and suspension.

Fig. 3 is a section view showing the method of assembly of the rings upon which the springs are suspended to the discs.

Fig. 4 is a section view showing another means of securing the springs to the rings.

Fig. 5 is a section view illustrating a method of securing a flat ring to the discs.

Fig. 6 is a view in section showing method of securing coil spring to flat ring.

Fig. 7 is a side elevation view showing details of flat ring assembly.

Fig. 8 is a bottom plan view of Fig. 6.

Fig. 9 is a view partly broken away showing assembly using a plurality of springs concentrically arranged.

Fig. 12 is a detail view of a portion of a side piece of the assembly shown in Fig. 11.

Fig. 13 is a cross sectional view of a portion of the assembly shown in Fig. 11.

Fig. 14 is a perspective view of the bearing portion of the upper movable frame for the type of spring assembly shown in Fig. 11.

Fig. 15 is a perspective view partly broken away of a portion of a multiple coil valve spring assembly wherein compression springs are used in place of tension springs.

Fig. 16 is a perspective view broken away in part of still another form of multiple coil valve spring assembly utilizing another manner of arranging and suspending the springs.

Fig. 17 is an enlarged detail view in perspective of a portion of a one-piece anchoring means such as shown in Fig. 16.

Fig. 18 is a perspective view of a circular form of anchoring means such as shown in Fig. 16.

Fig. 19 is a detail view illustrating the method of rim and side assembly for structure shown in Fig. 18.

Figure 10:
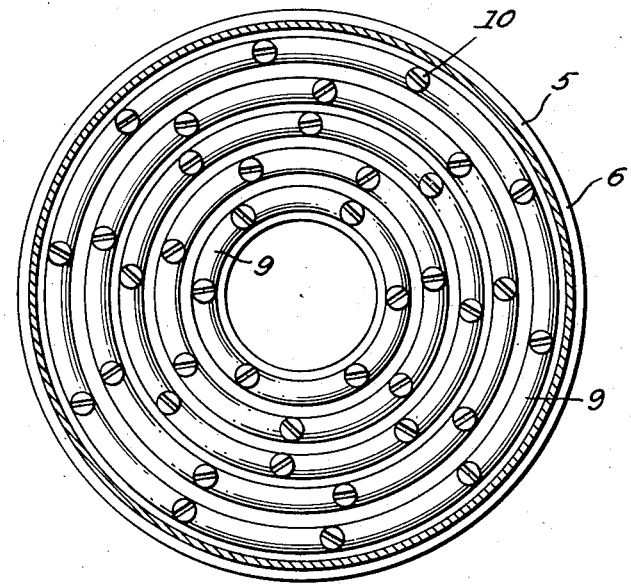
Fig. 10 is a plan view of the lower disc and ring assembly of Fig. 1.

In detail, Fig. 1 shows a valve spring assembly in which the valve stem 1 having pin 2 adjacent its lower end is mounted for vertical movement in valve guide 3. Secured to guide 3 is the spring enclosing casing comprising top disc 4, side 5 and bottom disc 6. The valve guide 3 extends downwardly from disc 4 with reduced diameter to afford a bearing for the valve stem 1 within the spring enclosing casing. Within the casing is mounted a spring supporting disc 7 provided with a sleeve 7a which surrounds the reduced portion of guide 3. Thus the outer side of the reduced part of valve guide 3 provides a bearing for sleeve 7a, permitting vertical reciprocation of disc 7.

The lower end of sleeve 7a is provided with a shoulder 7b adapted to be engaged by pin 2 of valve stem 1. Discs 6 and 7 slope upwardly toward their peripheries with same slope.

Secured to the under side of disc 7 and the upper side of anchored disc 6 by means of screws 10, as shown in Fig. 3, are a plurality of concentrically arranged spring anchoring rings 9. Fastened to these rings and extending between discs 7 and 6 are a plurality of coil springs 8, of predetermined number and size, under predetermined tension. These springs are secured to rings 9, as shown in Fig. 2. A long coil spring may be used in which case a few turns at the end are bent at right angles to the rest and slipped over the open end of a ring 9. The proper length of coil for one spring is measured, the coil there bent at right angles and enough turns to space the coil the proper distance from the next one slipped over the lower ring of same diameter. A second coil is then measured off and the required number of turns at the end placed on the upper ring. This is clearly shown in Fig. 2 at 11. When the pair of rings are filled with coils their open ends may be secured together. Adjoining coils of springs are wound alternately clockwise and counterclockwise to prevent lateral interference or interlacing.

Obviously the springs may be anchored to the rings in any manner and collars 12, as shown in Fig. 2, may be used as spacers.

In place of the rings formed from cylindered stock may be substituted rings from flat stock, such as shown in Figs. 5, 6, 7 and 8. In such case the discs 6 and 7 are grooved for the edges of the flat rings 13, as shown in Fig. 5. The rings are secured to the discs by eyelets 14 provided with threaded ends and nuts 15. The ribbon or flat rings 13 are provided with holes for receiving the ends of the springs which are inserted in two holes and then bent over to securely anchor the springs.

Where space is particularly limited a plurality of springs 16 of increasing diameter may be arranged concentrically and secured to the anchoring rings, as shown in Fig. 9.

Discs and strip rings may be replaced by L shaped strips 17 held in a square frame consisting of end pieces 19 and side strips 20, bolted together by bolts 23 threaded at one end and with screw heads at the other. The strips are separated by spacing strips 18, composed of fibre, cardboard, or any suitable material. The center block 21, 22, is supported by strips 24 dovetailed into end pieces. The coils are attached in the same manner as to ring strips. End block 22, with extended sleeve, containing abutment ring 25, is used for the frame which replaces the upper disc 7, and block 21 for lower frame. On the lower frame the side and end pieces are extended upwards, performing the same function as the barrel 5, to meet the square plate, not shown, which replaces the disc 4. (Fig. 1).

While the tension type of spring is the best, I have made an improvement which makes the compression type workable.

In Figure 15, 1 is the valve stem, 2 is the pin by which the sleeve is lifted by engaging the inner abutment of the sleeve at the bottom end of the disc 27 which, when valve stem 1 is raised by the tappet, compresses spring 8, which is coiled around rod 26. In Fig. 15 but three of these rods are shown, whereas in the actual construction the same number in concentric rings are employed as the tension springs 8 in Fig. 1.

Figure 11:
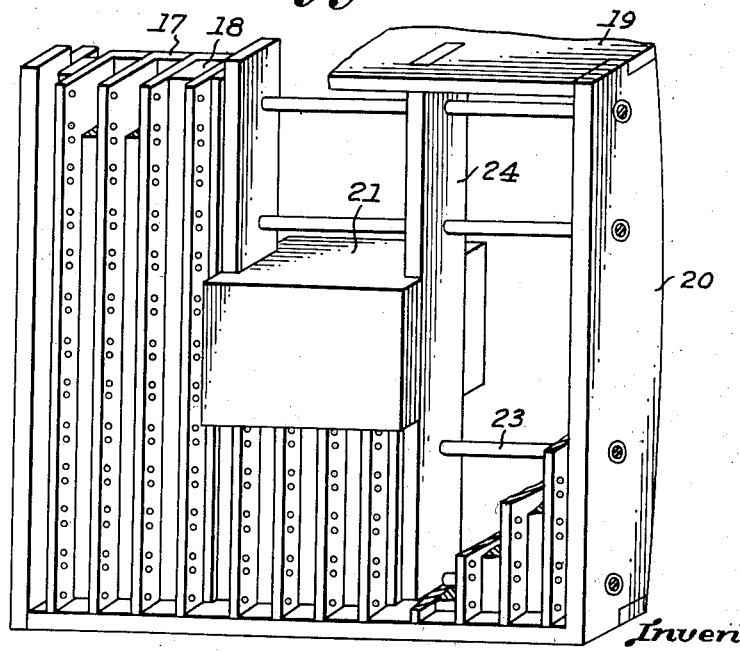
Fig. 11 is a perspective view of another form of spring assembly anchoring means and closure.

The discs 27 and 28 may also be in rectangular form giving a rectangular arrangement of compression springs similar to the rectangular arrangement of tension springs in Fig. 11. In Fig. 15 the springs are compressed by the rising of plate 27. Small rods 26 attached to plate or disc 28 pass through the coils to prevent bending. The other ends of the rods are attached to another fixed plate, not shown, and subjected to sufficient tension to keep them straight.

In the alternate square form, Fig. 16, disc 6 is replaced by a flat plate 29, slotted around each edge to receive the cover 5. Disc 7 is replaced by plate 30 and attached sleeve 31. To the plates are bolted or screwed four angle pieces 32, with holes through which pass small rods 33. The coils are attached to the rods by forming a loop at each end of the coil to pass over the rod. Three coils are shown, to illustrate the method of mounting. Coils are wound alternately right and left to avoid interlacing from lateral vibration. Four or five of the rods extend through holes in the cover and are riveted, or threaded and fastened with nuts on the outside.

If desired, these square plates may be replaced by discs 34, using the same method for suspension for the coils.

A rim 35 is attached to receive the ends of the rods and for the lower plate is furnished with a projection to support the cover. The rim may be recessed, as shown, to fit over the edge of the plate, may be brazed or spot welded, or may be attached by small lugs (not shown) of angle iron bolted or welded to the rim and the plate.

The plates and attached angle iron strips may be replaced by an integral form milled from one piece. Obviously, this method may be used for the circular form.

Of utmost importance in practicing this invention is the understanding of the method by which the size of the springs, the diameter of the wire from which they are made, and the number of springs to be used is determined. The fundamental theory upon which this invention is based is that sufficiently small springs must be used to obtain the desired speed of action and a sufficient number of such springs be combined for concerted action so as to produce the necessary tension or pull for accomplishing the work. It is known that the speed of return of a spring increases with the reduction of the diameter of the wire from which it is made. In other words, speed varies inversely with the diameter. Single valve springs fail due to lack of speed before the maximum speed of the motor is reached and therefore the maximum power is not obtained. To determine the size spring to be used to function at a given high motor speed, proceed in this manner:

Select a given number of single valve springs, say ten, of graduated sizes and test them individually in a motor block. By the use of a stroboscope, or any other device or method, observe the cam and tappet action as the speed of the motor is increased and record the R. P. M. at which the tappets leave the cams and float or bounce. It is at this stage that the spring fails in its speed. By recording the spring sizes and their respective points of failure sufficient data is obtained for graphing the spring action. From this graph may be estimated with certainty the diameter of spring wire that will be fast enough to function efficiently at a given higher speed which is desired, such as the maximum speed of a particular engine. From this may be computed the necessary safety factor and the spring size or diameter of wire is then known. However, such a spring, by itself, would not have sufficient tension so it must be determined how many of such springs must be included in the assembly to exert the required tension. This is ascertained as follows:

The tension of a single coil of the small given diameter is then recorded by use of a dynamometer or similar power measuring instrument. The amount of power or tension required is known so that by dividing the power of the single spring into the power required, the number of needed springs or coils is obtained. Here, again, the safety factor is computed to get just the proper number of coils in the assembly.

As a concrete example of the number and size of coils used and results obtained, a four cylinder Dodge 1925 automobile was experimented on as follows:

The original valve springs were single coils of wire of 0.125" diameter. There were substituted for each such valve spring 212 coils each formed of wire of 0.01" diameter. Tests after the substitution indicated an increase in speed of valve action of 260%.

In operation: The structure shown in Fig. 1 is actuated by a cam (not shown) which at the proper time will cause the valve to be lifted. The pin 2 abutting the shoulder 7b moves the sleeve 7a and disc 7 upwardly. The lower disc 6 is anchored to the valve guide at the top of the valve spring chamber and cannot move so that the springs 8 are stretched by the upward movement of 7. They permit but resist the action of the cam so that when the cam allows the valve to return to closed position the plurality of springs 8 will speedily return the valve to closed position. Thus the usual upward movement of the valve which ordinarily compresses the valve spring in this case stretches the springs to effect the same result.

The other variations function in the same general manner except that shown in Fig. 15 in which the springs are compressed.

In constructing the coil springs the preferred ratio between mandrel and wire diameters is six to one. The length of the coil or the diameter of the coil is irrelevant as the speed and tension remain substantially constant for a wire of given diameter. The larger the coil or the greater the diameter of the coil the greater the durability of the spring, but speed of return is determined by the diameter of the wire used in making up the coil spring.

It is obvious that the novel spring assembly above described may be utilized in any cam actuated mechanism and may be used wherever a fast return movement is required.

I claim:

1. A valve spring assembly comprising a valve with a stem, a guide for the valve stem, a spring enclosing casing surrounding the valve stem, a reciprocating member within the casing, a guide for said member and a plurality of coil springs extending between said reciprocating member and the opposing portion of the casing whereby the springs are extended when the valve is moved to open position.

2. A valve spring assembly comprising a valve with a stem, a guide for the valve stem, a spring enclosing casing surrounding the valve stem, a reciprocating member within the casing, a sleeve extending from said member around a reduced portion of the valve guide, a shoulder on said sleeve, a plurality of coil springs extending between and anchored to said member and said casing respectively, and a shoulder on said valve stem adapted to abut the shoulder on the sleeve to move the reciprocating member with the valve stem to stretch said springs when the valve is moved to open position.

3. A valve spring assembly comprising a valve having a stem, a movable member operably joined to said stem so as to be moved thereby, said member comprising a plurality of concentrically arranged rings, a stationary member opposing said movable member, said stationary member likewise comprising a plurality of concentrically arranged rings and a plurality of coil springs extending between said members and anchored to said rings whereby when the valve is moved to open position the springs are extended.

4. A valve spring assembly comprising a valve having a stem, a plate movable with the valve, a stationary plate, parallel bars secured to said plates and a plurality of coil springs extending between said plates and anchored to said bars whereby when said valve is moved to open position the springs are stretched.

5. A valve spring assembly for internal combustion engines comprising a valve, a stem, a valve guide, said valve guide being of reduced diameter at its lower end, a spring casing anchored to said valve guide and surrounding said valve stem, a movable plate within said casing provided with a sleeve surrounding the reduced portion of the valve guide, a plurality of small coil springs anchored to said movable plate at their upper ends and to the casing at their lower ends and slightly extended therebetween, each of said springs having the speed necessary to cause the valve to open and close properly at the maximum engine speed, the sum of the tensions of each spring being sufficient to produce the necessary pull, operable means between the stem and the sleeve to cause the movable plate to move away from the stationary plate to stretch the springs when the valve is moved to open position.

6. A reciprocating spring assembly comprising a movable member, a stationary member, parallel bars secured to said members, and a plurality of coil springs extending between said plates and anchored to said bars whereby the springs are stretched upon the movement of the first member away from the stationary member.

7. A reciprocating spring assembly comprising a movable plate member, a stationary member, supporting means secured to said plates, parallel bars held by said supporting means, and a multipilcity of high-speed coil springs extending between said plate members and anchored to said bars whereby when said movable plate member is moved away from such stationary plate member said springs are stretched.

ARTHUR THOMAS EMERY.